(12) United States Patent
O'Connor et al.

(10) Patent No.: US 6,912,644 B1
(45) Date of Patent: Jun. 28, 2005

(54) METHOD AND APPARATUS TO STEER MEMORY ACCESS OPERATIONS IN A VIRTUAL MEMORY SYSTEM

(75) Inventors: Dennis M. O'Connor, Chandler, AZ (US); Stephen J. Strazdus, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 10/383,082

(22) Filed: Mar. 6, 2003

(51) Int. Cl.⁷ .............................................. G06F 13/16
(52) U.S. Cl. ........................................................ 711/211
(58) Field of Search ................................ 711/154, 202, 711/209, 211; 710/316

(56) References Cited

U.S. PATENT DOCUMENTS

| | | | |
|---|---|---|---|
| 5,946,716 A | 8/1999 | Karp et al. | |
| 6,286,091 B1 | 9/2001 | Park | |
| 6,681,311 B2 * | 1/2004 | Gaskins et al. | ............. 711/203 |
| 6,704,854 B1 * | 3/2004 | Meier et al. | ................ 712/204 |

* cited by examiner

*Primary Examiner*—Kevin L. Ellis
(74) *Attorney, Agent, or Firm*—The Law Offices of John C. Scott LLC

(57) ABSTRACT

A memory management unit (MMU) includes a translation look-aside buffer (TLB) that stores memory access steering data within corresponding TLB entries for use in steering memory access operations.

24 Claims, 4 Drawing Sheets

US 6,912,644 B1

METHOD AND APPARATUS TO STEER MEMORY ACCESS OPERATIONS IN A VIRTUAL MEMORY SYSTEM

BACKGROUND OF THE INVENTION

Virtual memory is a memory technique that allows a processor within a computing system to utilize an address space (i.e., the virtual address space) that is significantly larger than the actual physical address space available within the system. When the virtual address space is larger than the physical address space, one or more other forms of data storage within the system (e.g., a hard disk drive) are used to supplement the physical address space to achieve the larger virtual address space. To perform a memory access, the processor will typically specify a virtual address to which the access operation is directed. A memory management unit (MMU) will often be provided to, among other things, perform a translation between the virtual address specified by the processor and the actual physical address of the location being accessed. In the past, a variety of different architectures and techniques have been utilized for providing virtual memory functionality within computing systems. The mechanisms provided to implement virtual memory systems can be utilized to perform other functions as well.

DETAILED DESCRIPTION

Figure 1:
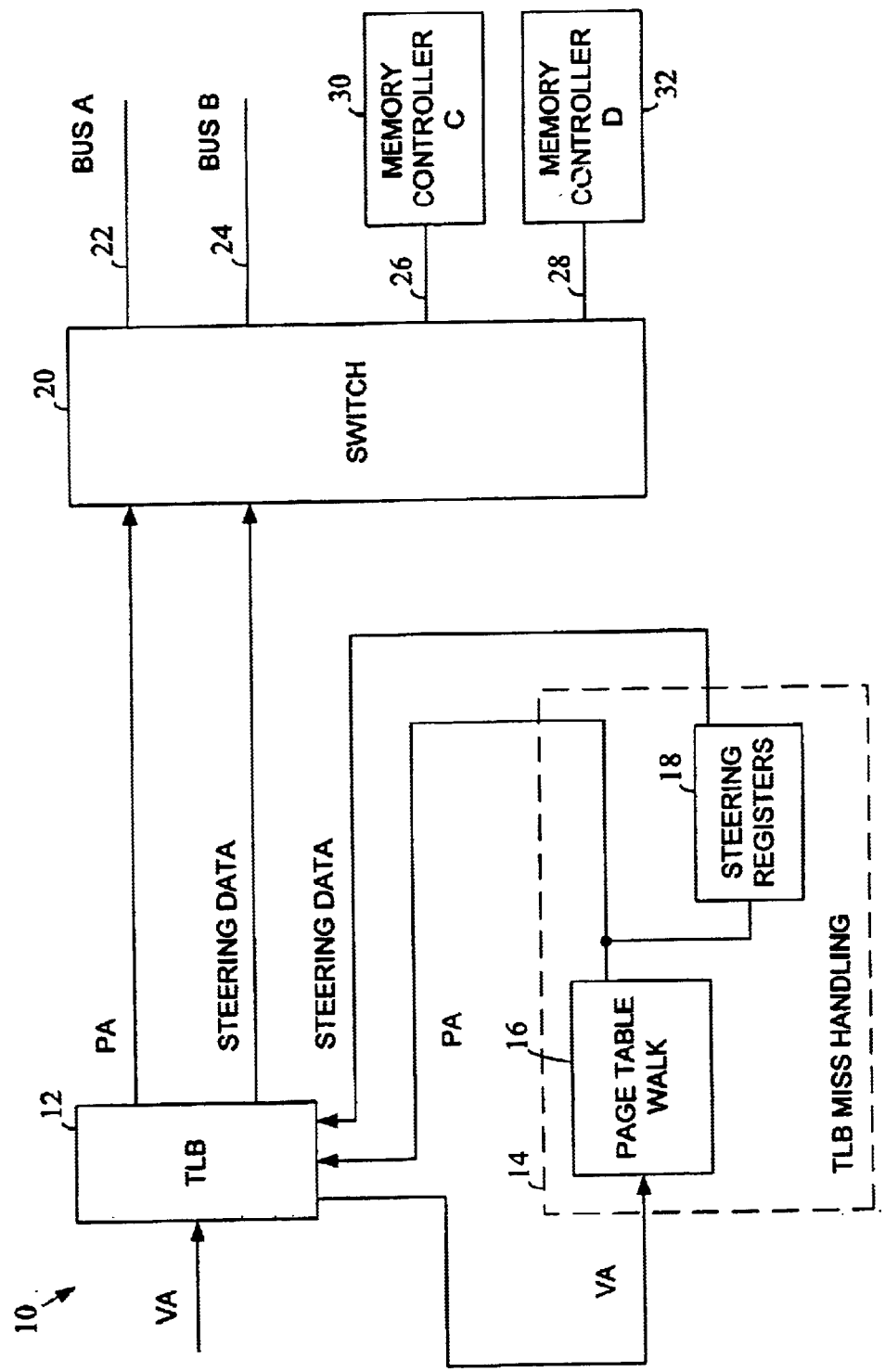
FIG. 1 is a block diagram illustrating a memory management unit (MMU) in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a memory management unit (MMU) 10 in accordance with an embodiment of the present invention. The MMU 10 may be used, for example, within a computing system that utilizes virtual memory to provide, among other things, translation between virtual addresses and physical addresses. In addition, the MMU 10 is capable of providing memory access steering functions within a computing system to direct memory access operations to appropriate portions of a physical address space. As illustrated in FIG. 1, the MMU 10 includes: a translation look-aside buffer (TLB) 12, a TLB miss handling unit 14, and a switch 20. The TLB 12 and the TLB miss handling unit 14 act cooperatively to, among other things, provide translation between an input virtual address (VA) and a corresponding physical address (PA). The switch 20 is operative for controllably coupling a physical address output by the TLB 12 to one of a number of output paths 22, 24, 26, 28 in response to steering data received from the TLB 12. Each of the output paths 22, 24, 26, 28 of the switch 20 is associated with a portion of the physical address space of the system. Thus, the MMU 10 is capable of steering memory access operations to the portion of the physical address space that includes the address being accessed.

A TLB is essentially a "results cache" that stores recently-produced virtual-to-physical translations on the assumption that they will be used again soon. The TLB 12 has a number of data entries stored within it for use in performing its functions. Each of the TLB entries is associated with a particular range of virtual addresses in the virtual address space of the system and includes information on the corresponding physical addresses for that range of virtual addresses. The physical address information within the entry may include the entire physical address corresponding to the virtual address or just a portion of the physical address (e.g., a physical page number). In accordance with at least one embodiment of the invention, each of the TLB entries also includes steering data for the associated range of virtual addresses. The steering data is control data that is delivered to the switch 20 to steer a corresponding physical address output by the TLB 12 to an appropriate portion of the physical address space of the system. In addition to the physical address, other information (e.g., write data, control data, etc.) may also be steered by the switch 20. The TLB entries may also include other information such as, for example, access permission information. The TLB 12 generally only includes entries for a subset of the virtual addresses in the virtual address space of the computing system.

When a virtual address is received at the input of the TLB 12, the TLB 12 first checks to see if the virtual address falls within the range of one of the entries within the TLB 12. If there is an entry for the virtual address, the TLB 12 outputs the associated physical address information and steering data (and possibly other information) to the switch 20. The switch 20 then directs the physical address information to one of its output paths 22, 24, 26, 28 based on the steering data. If the TLB 12 does not have an entry for the input virtual address, the TLB miss handling unit 14 may be used to generate an entry. The new entry will then be entered into the TLB 12 and the corresponding physical address information and steering data may be output to the switch 20. Typically, an older entry will need to be removed from the TLB 12 to make room for the new entry. In one approach, the least recently used entry in the TLB 12 will be replaced with the new entry. Other replacement techniques may alternatively be used.

In the illustrated embodiment, the TLB miss handling unit 14 includes a page table walk unit 16 and steering registers 18 for use in generating the physical address information and the steering data for the new entry. The page table walk unit 16 has access to a data structure known as a "page table"

that may include address translation information for all mapped virtual addresses in the virtual address space of the system. The page table walk unit 16 performs a "page table walk" through the page table to determine the appropriate physical address information for the input virtual address. Techniques for performing page table walks are known in the art. The page table walk unit 16 may be implemented in hardware, software, and/or firmware. The steering registers 18 are operative for determining the appropriate steering data for the input virtual address. In the illustrated embodiment, the steering registers 18 are coupled to the output of the page table walk unit 16 and thus utilize the physical address information generated by the page table walk unit 16 to determine the appropriate steering data (e.g., by determining an address range within which the physical address falls and outputting the corresponding steering data). In another approach, the steering registers 18 use the input virtual address to determine the appropriate steering data and can thus work in parallel with the page table walk unit 16. The physical address information and the steering data generated by the page table walk unit 16 and the steering registers 18, respectively, are used to generate a new entry for the TLB 12. The physical address information and steering data will also be delivered to the switch 20 (either through the TLB 12, as illustrated, or directly from the TLB miss handling unit 14).

As described previously, the switch 20 is operative for steering physical address information output by the TLB 12 (and possibly other information) to one of a plurality of output paths 22, 24, 26, 28 based on corresponding steering data received from the TLB 12. Although illustrated with four output paths, it should be appreciated that the switch 20 may include any number of output paths greater than 1. Each of the output paths of the switch 20 may correspond to a different portion of the physical address space of the computing system. For example, in the embodiment of FIG. 1, the switch 20 includes a first output path 22 that is coupled to a first bus (BUS A), a second output path 24 that is coupled to a second bus (BUS B), a third output path 26 that is coupled to a first memory controller 30 (MEMORY CONTROLLER C), and a fourth output path 28 that is coupled to a second memory controller 32 (MEMORY CONTROLLER D). The first and second busses (BUS A, BUS B) may each have one or more addressable devices or structures connected to it such as, for example, universal asynchronous receiver transmitters (UARTs), video controllers, mass storage device controllers, analogue-to-digital converters, bridges to other busses, wired or wireless network interfaces, and/or others. The first and second memory controllers 30, 32 may each be operative for providing access to one or more corresponding addressable memory devices such as, for example, a random access memory (RAM), a read only memory (ROM), and/or others. The first and/or second memory controllers may also contain caches for the memory they control. The switch 20 may be any form of device or structure that is capable of steering input information to one of a plurality of paths based on steering data including, for example, a crossbar switch, a router, a switch fabric, a shared bus, a series of demultiplexers and/or multiplexors, and/or others. The form of steering data stored in the TLB 12 may depend on the type of switch being used.

Figure 2:
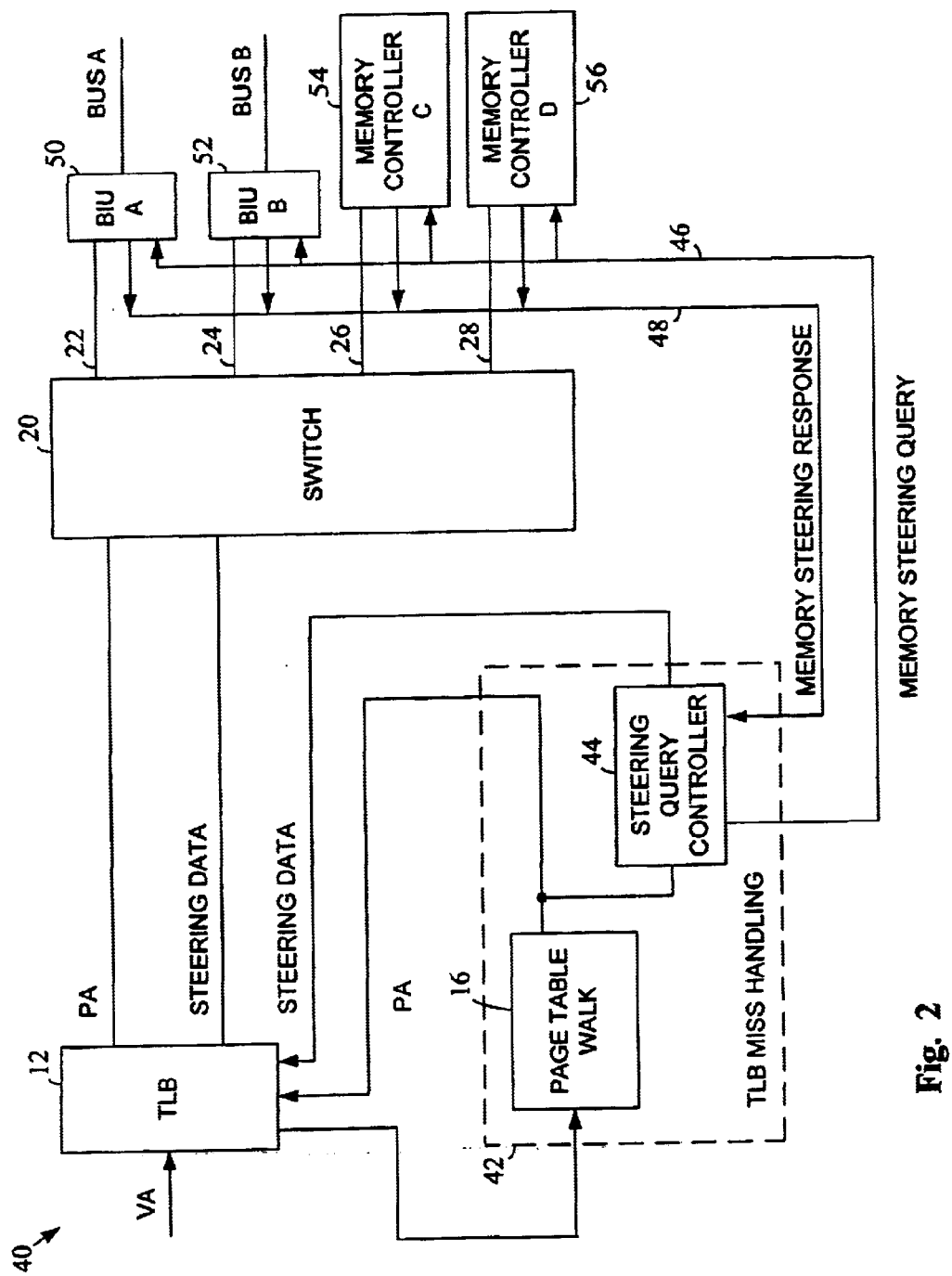
FIG. 2 is a block diagram illustrating a memory management unit (MMU) in accordance with another embodiment of the present invention.

FIG. 2 is a block diagram illustrating a memory management unit (MMU) 40 in accordance with another embodiment of the present invention. The MMU 40 includes: a TLB 12, a TLB miss handling unit 42, and a switch 20. The TLB 12 and the switch 20 are similar to those described previously. The TLB miss handling unit 42, however, includes a steering query controller 44 instead of (or in addition to) the steering registers 18 of FIG. 1. The steering query controller 44 is capable of querying physical structures, controllers, and/or devices within the system to determine information about the physical address space of the system. For example, in at least one embodiment, the steering query controller 44 sends queries to determine the type of addressable structures in the system, the amount of address space they require, and/or where the structures are located. Other types of queries may alternatively be used. The steering query controller 44 uses the response information it gathers to determine the appropriate steering data to be stored in the TLB 12. In one approach, the steering query controller 44 uses the gathered information to fill steering registers, similar to those described previously, that are then used to generate the steering data, and may only send out queries during system initialization, and/or when a physical address is presented for which no steering data has yet been acquired, and/or when directed to do so by software. In another approach, a query is sent out whenever the TLB miss handling subsystem is invoked. Because the steering query controller 44 has the ability to query structures within the system, the MMU 40 is able to adapt to a changing physical address space over time.

With reference to FIG. 2, the switch 20 may include a first output path 22 that is coupled to a first bus interface unit 50 (BIU A), a second output path 24 that is coupled to a second bus interface unit 52 (BIU B), a third output path 26 that is coupled to a first memory controller 54 (MEMORY CONTROLLER C), and a fourth output path 28 that is coupled to a second memory controller 56 (MEMORY CONTROLLER D). A first transmission medium 46 is provided to allow the steering query controller 44 to query the first bus interface unit 50, the second bus interface unit 52, the first memory controller 54, and the second memory controller 56 for information regarding, for example, addressable structures associated therewith. A second transmission medium 48 is provided to carry corresponding response information back to the steering query controller 44. In an alternative instantiation, there would be no dedicated transmission medium for steering queries, but instead these queries would travel over the switch itself, via a special protocol. The steering query controller 44 may request, for example, that the first and second bus interface units 50, 52 each perform an enumeration operation to identify devices connected to the bus and corresponding address information. Similarly, the steering query controller 44 may request that the first and second memory controllers 54, 56 each identify the range of memory addresses associated with each of the units. As will be appreciated, the types of queries that are delivered and the types of responses that are received will depend upon the specific system being implemented.

Figure 3:
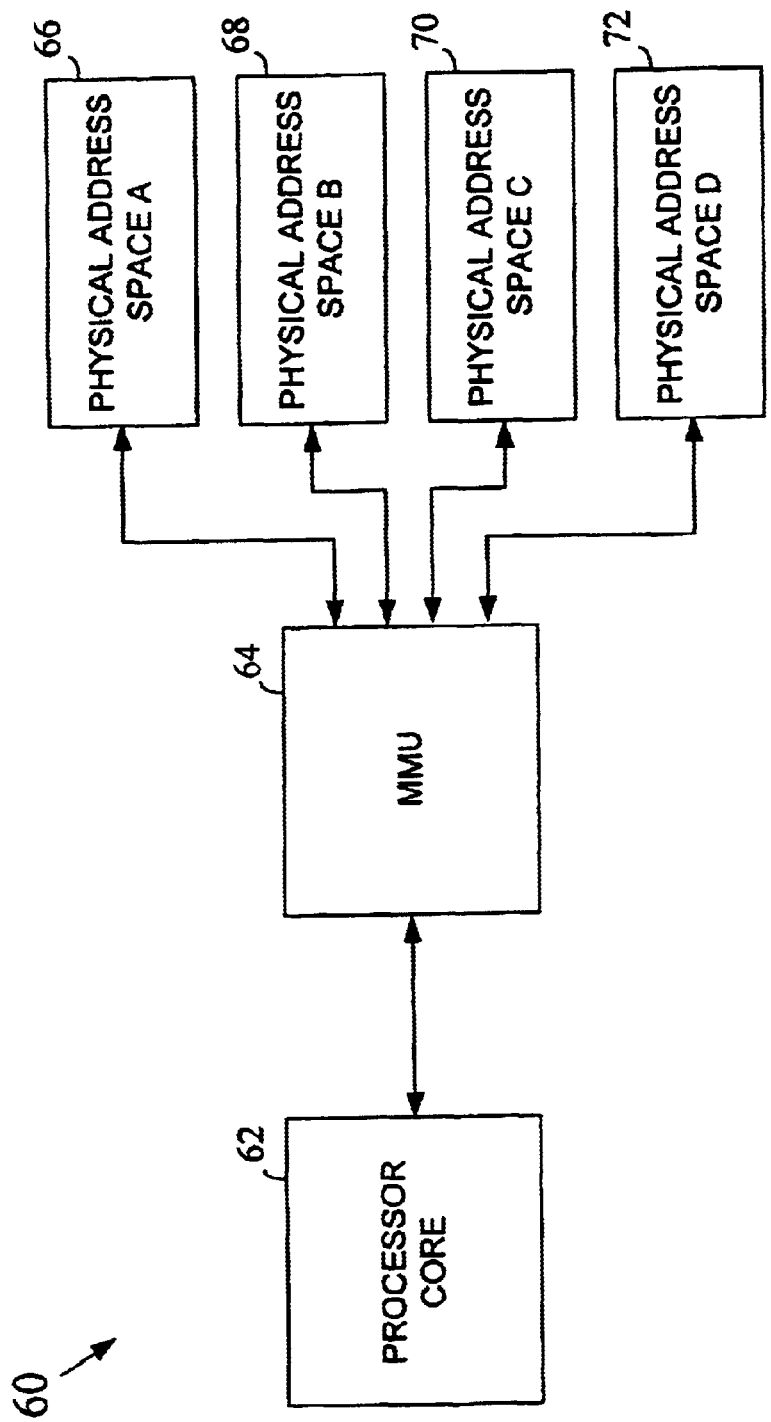
FIG. 3 is a block diagram illustrating a computing system in accordance with an embodiment of the present invention.

FIG. 3 is a block diagram illustrating a computing system 60 in accordance with an embodiment of the present invention. As illustrated, the computing system 60 includes: a processor core 62, a memory management unit (MMU) 64, and a number of physical address space portions 66, 68, 70, 72. In at least one implementation, the processor core 62 and the MMU 64 are part of the same microprocessor device. The MMU 64 includes a translation look-aside buffer (TLB) that stores steering data as part of its entries. The MMU 64 also includes a switch to steer a physical address (and possibly other information) output by the TLB to one of the physical address space portions 66, 68, 70, 72 based on steering data received from the TLB. The MMU 64 may include, for example, the MMU 10 of FIG. 1 or the MMU

40 of FIG. 2. The processor core 62 may deliver a virtual address to the MMU 64 as part of a memory access operation. The MMU 64 will perform a virtual to physical address translation for the virtual address and then direct the memory access operation to an appropriate portion of the physical address space based on steering data. For read operations, appropriate data paths are provided to deliver the requested read data back to the processor core 62.

Figure 4:
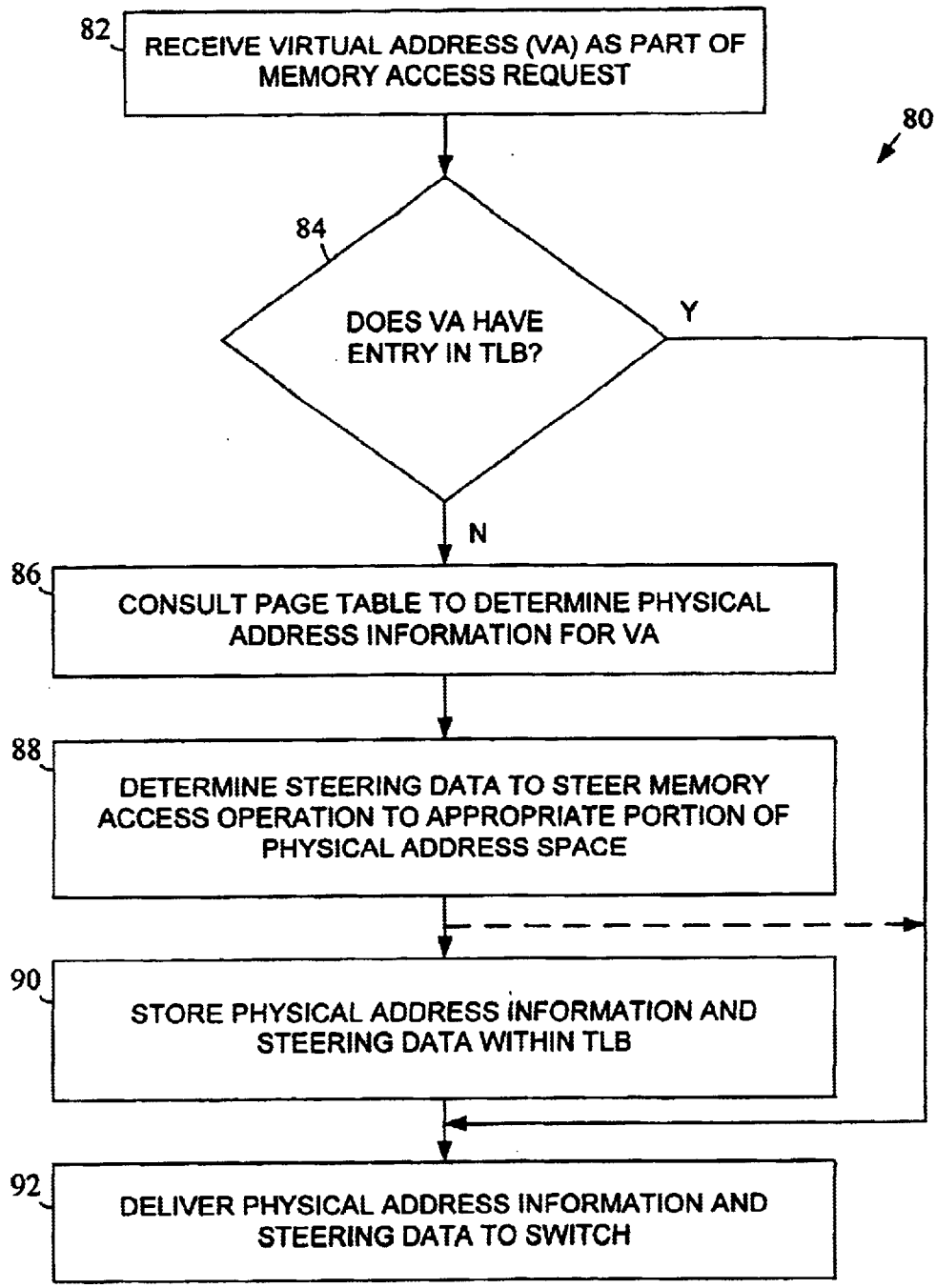
FIG. 4 is a flowchart illustrating a method in accordance with an embodiment of the present invention.

FIG. 4 is a flowchart illustrating a method in accordance with an embodiment of the invention. A virtual address (VA) is first received as part of a memory access operation (block 82). It is then determined whether the VA has a corresponding entry within a translation look-aside buffer (TLB) (block 84). If the VA has an entry within the TLB, physical address information and steering data from the entry are delivered to a switch that steers the physical address information (and possibly other information) to an appropriate portion of a physical address space based on the steering data (block 92). If the VA does not have an entry within the TLB, a page table is consulted to determine physical address information for the VA (block 86). In at least one approach, a page table walk is performed to determine the physical address information. The physical address information derived from the page table may include the entire physical address corresponding to the VA or only a portion of the physical address. For example, in at least one embodiment, the physical address information derived from the page table includes a page number portion of the physical address without a corresponding offset portion of the physical address. Steering data is also determined for the VA for use in steering the corresponding memory access operation to an appropriate portion of the physical address space (block 88). The physical address information and the steering data are next stored within the TLB in an entry corresponding to the VA (block 90). The physical address information and the steering data are also both delivered to the switch to appropriately steer the memory access operation (block 92).

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment. Thus, the following claims are hereby incorporated into the detailed description, with each claim standing on its own as a separate embodiment of the invention.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A memory management unit (MMU) comprising:
a translation look-aside buffer (TLB) having a plurality of TLB entries stored therein for use in translating between virtual addresses and physical addresses, said plurality of TLB entries including a first entry having physical address information and memory access steering data corresponding to a first virtual address.

2. The MMU of claim 1, wherein:
said memory access steering data is control data for use in controlling a switch in communication with the TLB.

3. The MMU of claim 1, wherein:
said TLB includes an input and first and second outputs, said TLB to output said physical address information at said first output and said memory access steering data at said second output in response to receipt of said first virtual address at said input.

4. The MMU of claim 1, wherein:
said plurality of TLB entries includes multiple entries having physical address information and memory access steering data stored therein.

5. A memory management unit (MMU) comprising:
a translation look-aside buffer (TLB) having a plurality of TLB entries stored therein for use in translating between virtual addresses and physical addresses; and
a TLB miss handling unit coupled to the TLB to generate, when an input virtual address does not have a corresponding entry within said TLB, physical address information and memory access steering data corresponding to said input virtual address for use in forming a new entry for the TLB.

6. The MMU of claim 5, wherein:
said TLB miss handling unit includes a page table walk unit to perform a page table walk for said input virtual address to produce said physical address information.

7. The MMU of claim 5, wherein:
said TLB miss handling unit includes steering registers to determine said memory access steering data for said input virtual address.

8. The MMU of claim 7, wherein:
said steering registers use said physical address information corresponding to said input virtual address to determine said memory access steering data.

9. The MMU of claim 5, wherein:
said TLB miss handling unit includes a steering query controller to collect information about a physical address space in a system by query and response.

10. A memory management unit (MMU) comprising:
a translation look-aside buffer (TLB) having a plurality of TLB entries stored therein for use in translating between virtual addresses and physical addresses; and
a switch to connect an output of the TLB to one of a plurality of output paths in response to memory access steering data received from the TLB.

11. The MMU of claim 10, wherein:
said switch includes a crossbar switch.

12. The MMU of claim 10, wherein:
said plurality of output paths includes at least one path that is coupled to a bus.

13. The MMU of claim 10, wherein:
said plurality of output paths includes at least one path that is coupled to a memory controller.

14. The MMU of claim 10, wherein:
said plurality of TLB entries includes a first entry having physical address information and memory access steering data corresponding to a first virtual address.

15. A method comprising:
determining whether an input virtual address has a corresponding entry within a translation look-aside buffer (TLB); and
when the input virtual address does not have a corresponding entry within the TLB:
consulting a page table to determine physical address information for the input virtual address;
determining memory access steering data for the input virtual address; and storing the physical address information and the memory access steering data for the input virtual address in the TLB.

16. The method of claim 15 wherein:

consulting a page table and determining memory access steering data are performed in parallel.

17. The method of claim 15 wherein:

said memory access steering data is determined using said physical address information.

18. The method of claim 15 wherein:

consulting a page table includes performing a page table walk.

19. The method of claim 15 wherein:

storing the physical address information and the memory access steering data includes replacing a previous entry in the TLB with a new entry including the physical address information and the memory access steering data.

20. The method of claim 15 wherein:

said memory access steering data is data for controlling a switch in communication with an output of the TLB.

21. A computer system comprising:

a processor core;

a physical address space separated into a plurality of portions, said plurality of portions including at least a first portion and a second portion; and a memory management unit (MMU) to facilitate performance of memory access operations requested by the processor core, said MMU including:

a translation look-aside buffer (TLB) having a plurality of TLB entries stored therein for use in translating between virtual addresses and physical addresses; and a switch to steer an output of the TLB to one of said plurality of physical address space portions in response to memory access steering data received from the TLB.

22. The computer system of claim 21, wherein:

said switch includes a plurality of output paths, said plurality of output paths including a first output path in communication with said first portion of said physical address space and a second output path in communication with said second portion of said physical address space.

23. The computer system of claim 21, wherein:

said switch is a crossbar switch.

24. The computer system of claim 21, wherein:

said processor core and said MMU are part of the same microprocessor device.

* * * * *